United States Patent
Eng et al.

(10) Patent No.: US 8,014,483 B2
(45) Date of Patent: Sep. 6, 2011

(54) METHOD OF ACQUIRING INITIAL SYNCHRONIZATION IN IMPULSE WIRELESS COMMUNICATION AND RECEIVER

(75) Inventors: Yew Soo Eng, Singapore (SG); Zhan Yu, Singapore (SG)

(73) Assignee: Panasonic Corporation, Osaka (JP)

( * ) Notice: Subject to any disclaimer, the term of this patent is extended or adjusted under 35 U.S.C. 154(b) by 660 days.

(21) Appl. No.: 12/092,488

(22) PCT Filed: Nov. 4, 2005

(86) PCT No.: PCT/JP2005/020306
§ 371 (c)(1),
(2), (4) Date: May 2, 2008

(87) PCT Pub. No.: WO2007/052355
PCT Pub. Date: May 10, 2007

(65) Prior Publication Data
US 2009/0290670 A1    Nov. 26, 2009

(51) Int. Cl.
*H04L 7/02* (2006.01)
(52) U.S. Cl. ........ 375/360; 375/134; 375/354; 375/358; 375/363; 375/365; 375/137; 375/147; 375/149; 375/355; 375/260; 370/350; 370/503; 370/509; 370/512; 370/515; 340/870.24; 340/855.3; 340/870.19; 340/12.13; 340/12.17; 332/112; 332/185; 342/132; 342/137; 342/202; 329/313
(58) Field of Classification Search ........... 375/364, 375/362, 360, 149, 150, 142, 256, 219, 316, 375/295, 134, 137, 145, 354, 355, 358, 363, 375/365, 367, 260; 340/870.24, 855.3, 870.19, 340/12.13, 12.14, 12.17; 332/112, 185; 329/313; 342/83, 132, 137, 202; 370/350, 503, 509, 512, 515, 520
See application file for complete search history.

(56) References Cited

U.S. PATENT DOCUMENTS
7,099,422 B2 *  8/2006  Hoctor et al. ............ 375/354
2003/0198212 A1  10/2003  Hoctor
2003/0198308 A1  10/2003  Hoctor

FOREIGN PATENT DOCUMENTS
EP    1 458 113    9/2004

OTHER PUBLICATIONS
International Search Report dated Jan. 31, 2006.
European Search Report dated Dec. 17, 2010.

* cited by examiner

Primary Examiner — Dac Ha
Assistant Examiner — Rahel Guarino
(74) Attorney, Agent, or Firm — Dickinson Wright PLLC

(57) ABSTRACT

A receiver in an impulse wireless communication. The receiver (300) includes a pulse-pair correlator (304) that receives a signal (316) and divides it into two signals for paths. One of the signals is input to signal multiplier (312) while another signal is delayed by a delay unit (310). The signal multiplier (312) multiplies the received signal (316) by a delayed signal (318). An integrator (314) integrates an output signal (322) over a designated period of time. An adding module (306) sums an output signal (324) from the integrator (314). An acquiring module (308) compares an summing-up output (326) from the adding module (306) with a predetermined threshold value to detect the existence of a transmitting-standard preamble.

3 Claims, 5 Drawing Sheets

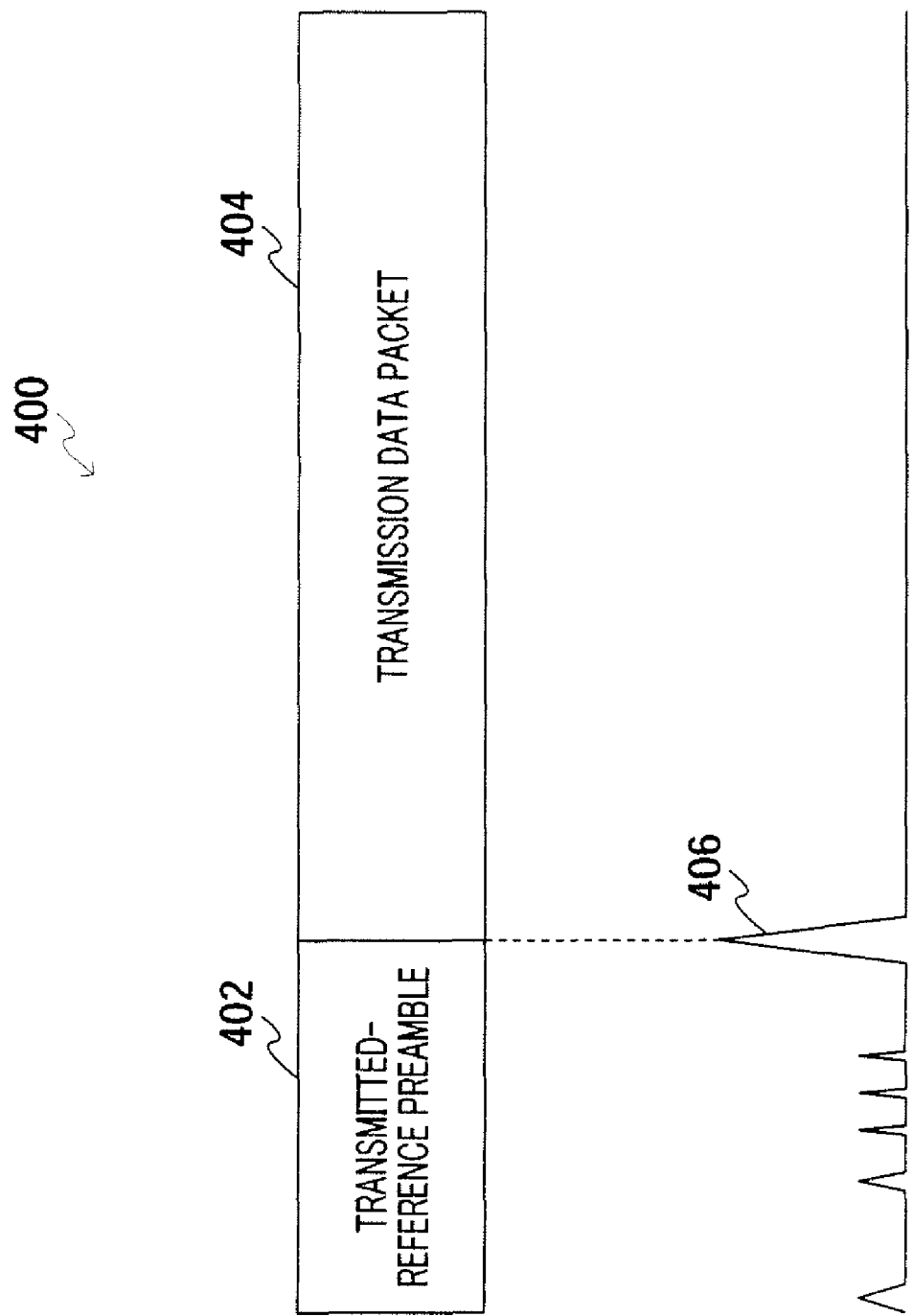

METHOD OF ACQUIRING INITIAL SYNCHRONIZATION IN IMPULSE WIRELESS COMMUNICATION AND RECEIVER

TECHNICAL FIELD

The present invention relates to a method of acquiring initial synchronization and a receiving apparatus in impulse radio communication using a transmitted-reference preamble.

BACKGROUND ART

Recent advances in a communication technology have enabled the use of transmitting and receiving sequences of very short-duration radio frequency (RF) pulses, the duration of which is typically less than a nanosecond. This is often referred to as "impulse radio (IR)."

There are various conventional implementations of receiving apparatuses and transmitting apparatuses for IR signals. IR transmitting apparatuses and IR receiving apparatuses can employ numerous data modulation (and demodulation) techniques, including amplitude modulation, phase modulation, frequency modulation, pulse-position modulation (PPM) (also referred to as "time-shift modulation" or "pulse-interval modulation") and M-ary versions of these.

At present, the most well known method is the PPM scheme. This method works by transmitting and receiving pulses in one of a plurality of time slots in successive time frames, which requires close time synchronization between the transmitting apparatus and the receiving apparatus. The PPM modulation scheme is also referred to as a "time modulated" method, because the relativity of the arrival of the pulses is important information that the receiving apparatus must know in order to demodulate the transmission information.

One issue with the time modulated impulse radio transmission scheme is the difficulty of establishing time synchronization. This is especially true when the transmission information is comprised of bursts of transmission symbols, and, in this case, the receiving apparatus has no prior information about the timing at the transmitting apparatus.

Recently, a new alternative UWB communication scheme, referred to as a "TR (transmitted-reference) scheme" has been invented. Patent Document 1 discloses one such TR scheme. The term "transmitted-reference" refers to the transmission and reception of a plurality of pulses in such a manner that synchronization with individual pulses is unnecessary. Pulses are transmitted in pairs, and, in this case, the first pulse is a reference pulse and the second pulse is a data modulated pulse. The reference pulse and the data modulated pulse in each pulse pair are identical. Pulse pairs are separated or delayed from each other by time intervals, that is, by delays, which are known to the receiving apparatus. Transmitted-reference UWB transmits pulses in pairs, and thereby induces a correlation at the receiving apparatus that can be measured by standard means. That is, the transmitted-reference scheme does not have the synchronization problem which occurs in the time modulated scheme.

There are several methods for acquiring synchronization using the transmitted-reference scheme. Patent Document 2 discloses one such method, where a transmitted-reference, delay-hopped (TR/DH) ultra-wideband signal is used to provide a pilot signal to acquire synchronization. The term "transmitted-reference" maintains the same definition from earlier explanation. The term "delay-hopped" refers to a code-division multiple access (CDMA) scheme. Although the TR/DH scheme does not have the problem with synchronization of the time modulated scheme such as PPM/TH, the TR/DH scheme provides a poor signal-to-noise ratio (SNR) and is more likely to cause multiple access interference. According to performance prediction based on mathematical modeling and computer simulations, the influence of the multiple access interference may limit the multiple access capacity of the TR/DH scheme to a degree where it will not be suitable for some applications.

Patent Document 1: US Patent Publication No. 2003198308: "Synchronization of ultra-wideband communications using a transmitted-reference preamble."

Patent Document 2: US Patent Publication No. 2003198212: "Method and apparatus for synchronizing a radio telemetry system by way of transmitted-reference, delay-hopped ultra-wideband pilot signal."

DISCLOSURE OF INVENTION

Problems to be Solved by the Invention

One problem with the time modulated impulse radio transmission scheme is the difficulty of establishing time synchronization. This is especially true when the transmission information is comprised of bursts of narrow pulses in nanoseconds, and, in this case, the receiving apparatus has no prior information whatsoever about the timing at the transmitting apparatus and needs to detect the presence of the transmission information prior to attempting to demodulate the transmission information.

In the absence of multiple access interference (MAI), the clock governing the pulse slots can easily be recovered from the received signal, while the frame clock must be recovered from a transmitted acquisition sequence. However, multiple access interference worsens this problem significantly. This is because the pulse-slot clocks of the separate transmitting apparatuses which interfere with each other will not be synchronized with that of the desired transmitting apparatus. This situation requires the acquisition of both the slot clock and the frame timing through the use of an acquisition sequence. The initial synchronization requires a very large computation amount, and this computational burden may result in a very long acquisition time.

Patent Document 1 discloses a method of initial synchronization that provides a time mark using a transmitted-reference, delay-hopped (TR/DH) burst as a preamble.

However, this method requires a bank of pulse pair correlators at the receiving apparatus for each pulse pair transmitted in the preamble, and this results in a very complicated structure of the receiving apparatus.

Means for Solving the Problem

It is therefore an object of the present invention to provide a novel method of initial synchronization acquisition in impulse radio communication using a transmitted-reference preamble and a receiving apparatus that simplify the structure of an impulse radio receiving apparatus by employing only one pulse pair correlator at the receiving apparatus instead of a bank of a plurality of correlators.

This method requires that, first, the transmitting apparatus sends a transmitted-reference preamble. This preamble is easily detected by the receiving apparatus and can be processed to provide a time mark at the receiving side of the communication system. The transmitted-reference preamble is comprised of a series of pulse pairs transmitted as a pulse train, and each pulse pair is comprised of a reference pulse and a data modulated pulse. The reference pulse and the data modulated pulse in each pulse pair are separated by a time separation. All pulse pairs transmitted in the transmitted-reference preamble have the same time separation between the reference pulse and the data modulated pulse. In the present invention, all pulse pairs in the transmitted-reference preamble, which represent different transmission symbols, have different pulse duration, $T_p$. This method of modulation will be referred to as "pulse width modulation" in this specification. Therefore, the transmitted-reference preamble is modulated by pulse width modulation.

After transmitting the transmitted-reference preamble modulated by pulse width modulation and waiting a fixed period of time, which is known to the receiving apparatus, the transmitting apparatus transmits transmission data packets including transmission message data. After receiving the transmitted-reference preamble, the receiving apparatus can estimate the time of reception of the transmission data packets with the accuracy of the time mark.

Advantageous Effect of the Invention

The present invention provides a synchronization method in the impulse radio communication system, that reduces the complexity of the structure of a receiving apparatus and hardware implementation by employing a transmitted-reference preamble sequence, which is comprised of a series of pulse pairs. In this transmitted-reference preamble sequence, each pulse pair, which represents a transmission symbol, has a unique pulse duration. Compared with the structure of the plurality of correlators, this synchronization method provides a simple structure of a receiving apparatus, and the receiving apparatus in the impulse radio communication system requires only one pulse pair correlator having a delay circuit, a multiplier and an integrator.

BRIEF DESCRIPTION OF DRAWINGS

FIG. 7 shows a structure of a burst signal and correlator output according to the present invention.

BEST MODE FOR CARRYING OUT THE INVENTION

Figure 1:
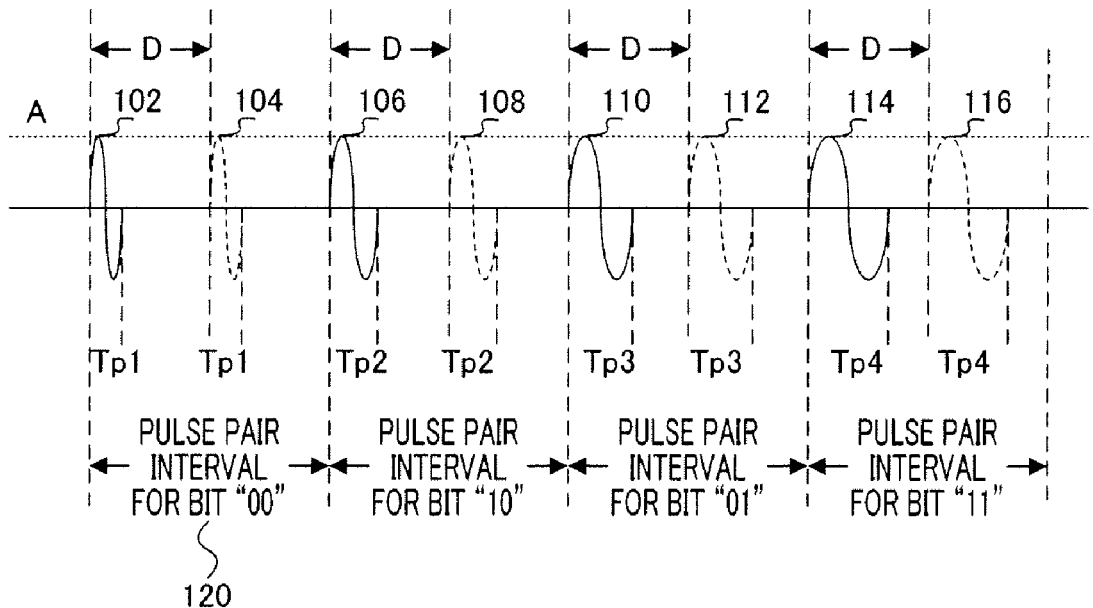
FIG. 1 shows a transmitted-reference preamble according to the first embodiment of the present invention.
Figure 2:
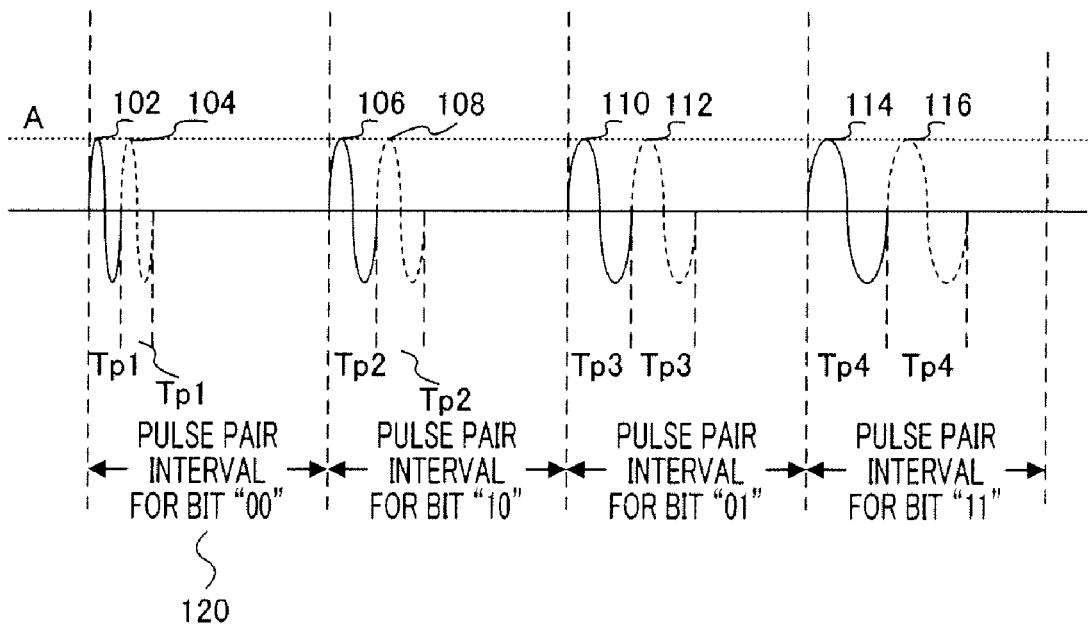
FIG. 2 shows a transmitted-reference preamble according to the second embodiment of the present invention.
Figure 3:
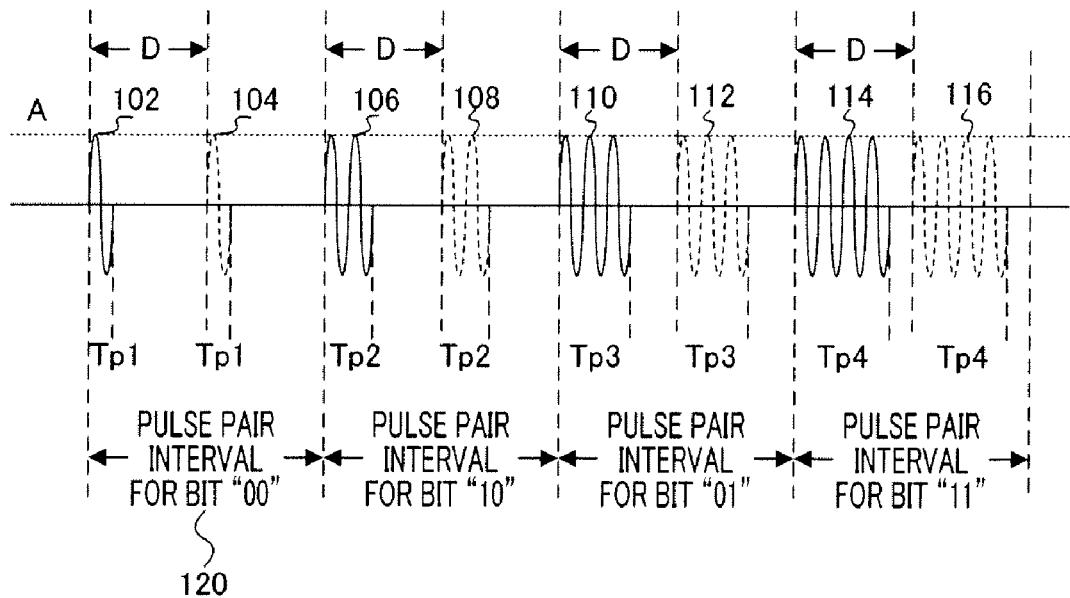
FIG. 3 shows a transmitted-reference preamble according to the third embodiment of the present invention.
Figure 4:
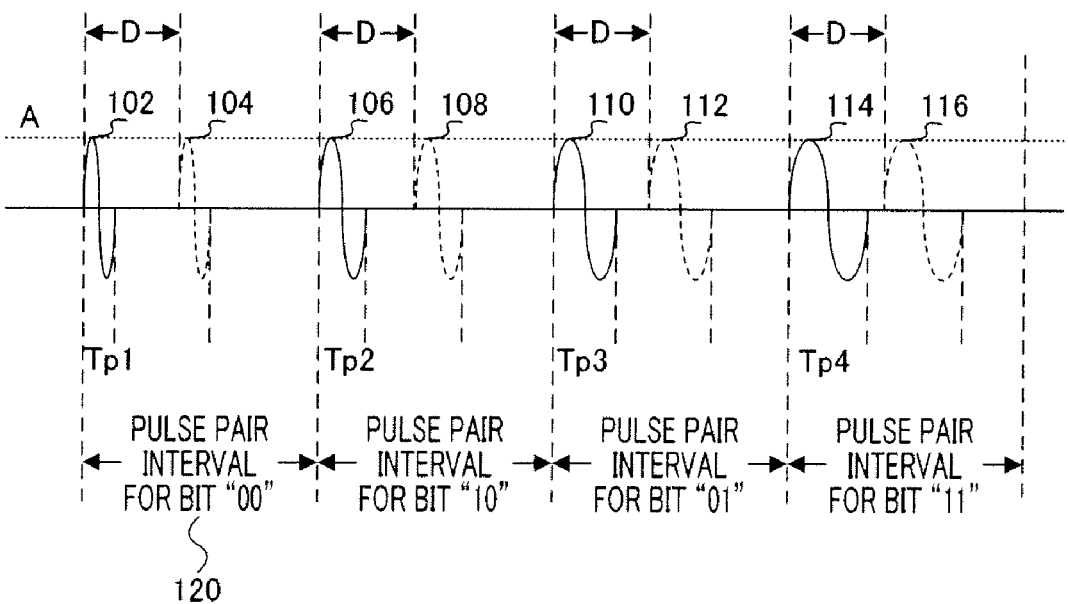
FIG. 4 shows a transmitted-reference preamble according to the forth embodiment of the present invention.

There are four embodiments for the transmitted-reference preamble sequence of the present invention. FIG. 1 shows the first embodiment of the transmitted-reference preamble sequence, FIG. 2 shows the second embodiment of the transmitted-reference preamble sequence, FIG. 3 shows the third embodiment of the transmitted-reference preamble sequence and FIG. 4 shows the fourth embodiment of the transmitted-reference preamble sequence.

FIG. 1 shows the first embodiment of the transmitted-reference preamble sequence that is communicated between a transmitted-reference impulse radio transmitting apparatus and a receiving apparatus. The number of pulse pairs, $N_p$, transmitted in transmitted-reference preamble 100A can be any integer greater than one, and the value of $N_p$ is known at the receiving apparatus. FIG. 1 shows four pulse pairs that are transmitted sequentially in transmitted-reference preamble sequence 100A. Each pulse pair is comprised of two identical pulse waveforms, and, of these, the first pulse waveform will be referred to as a "reference pulse" and the second pulse waveform will be referred to as a "data modulated pulse."

As shown in FIG. 1, the first pulse pair is comprised of identical reference pulse 102 and data modulated pulse 104. The second pulse pair is comprised of identical reference pulse 106 and data modulated pulse 108. The third pulse pair is comprised of identical reference pulse 110 and data modulated pulse 112. The fourth pulse pair is comprised of identical reference pulse 114 and data modulated pulse 116.

Each pulse pair in transmitted-reference preamble sequence 100A is separated from its neighboring pulse pairs by pulse pair interval 120, which is common in all pulse pairs in transmitted-reference preamble sequence 100A. All pulse pairs transmitted in transmitted-reference preamble 100A have the same time separation D between the reference pulse and the data pulse.

To modulate the transmitted-reference preamble, pulse width modulation is employed. Pulse duration $T_p$ of each pulse pair is used to associate each pulse pair with a transmission symbol. As shown in FIG. 1, the first pulse pair representing transmission symbol "00" has pulse duration $T_{p1}$, the second pulse pair representing transmission symbol "10" has pulse duration $T_{p2}$, the third pulse pair representing transmission symbol "01" has pulse duration $T_{p3}$ and the fourth pulse pair representing transmission symbol "11" has pulse duration $T_{p4}$. The pulse pairs representing respective transmission symbols in transmitted-reference preamble sequence 100A must each have a unique pulse duration.

As shown in FIG. 2, in the second embodiment of the transmitted-reference preamble sequence, there is no difference from the first embodiment shown in FIG. 1, except that time separation D between the reference pulse and the data pulse in transmitted-reference preamble 100B is zero. The data modulated pulse is transmitted immediately after the reference pulse, without delay, for each pulse pair in the transmitted-reference preamble.

FIG. 3 illustrates the third embodiment of the transmitted-reference preamble sequence. In this embodiment, time separation D between the reference pulse and the data pulse in transmitted-reference preamble 100C is not zero. The only difference between this third embodiment and the first embodiment is that the pulse pairs representing respective transmission symbols can be comprised of one or a plurality of cycles of pulse. As shown in FIG. 3, the first pulse pair representing transmission symbol "00" is comprised of one cycle of pulse, the second pulse pair representing transmission symbol "10" is comprised of two cycles of pulse, the third pulse pair representing transmission symbol "01" is comprised of three cycles of pulse, and the forth pulse pair representing transmission symbol "11" is comprised of four cycles of pulse.

FIG. 4 shows a transmitted-reference preamble according to the fourth embodiment. In this embodiment, pulse pair interval 120 is different for each transmission symbol of transmitted-reference preamble 100D. The first transmission symbol "00" has a pulse pair interval of $T_{f1}$, the second transmission symbol "10" has a pulse pair interval of $T_{f2}$, the third transmission symbol "01" has a pulse pair interval of $T_{\beta}$ and the fourth transmission symbol "11" has a pulse pair interval of $T_{\beta 4}$.

Figure 5:
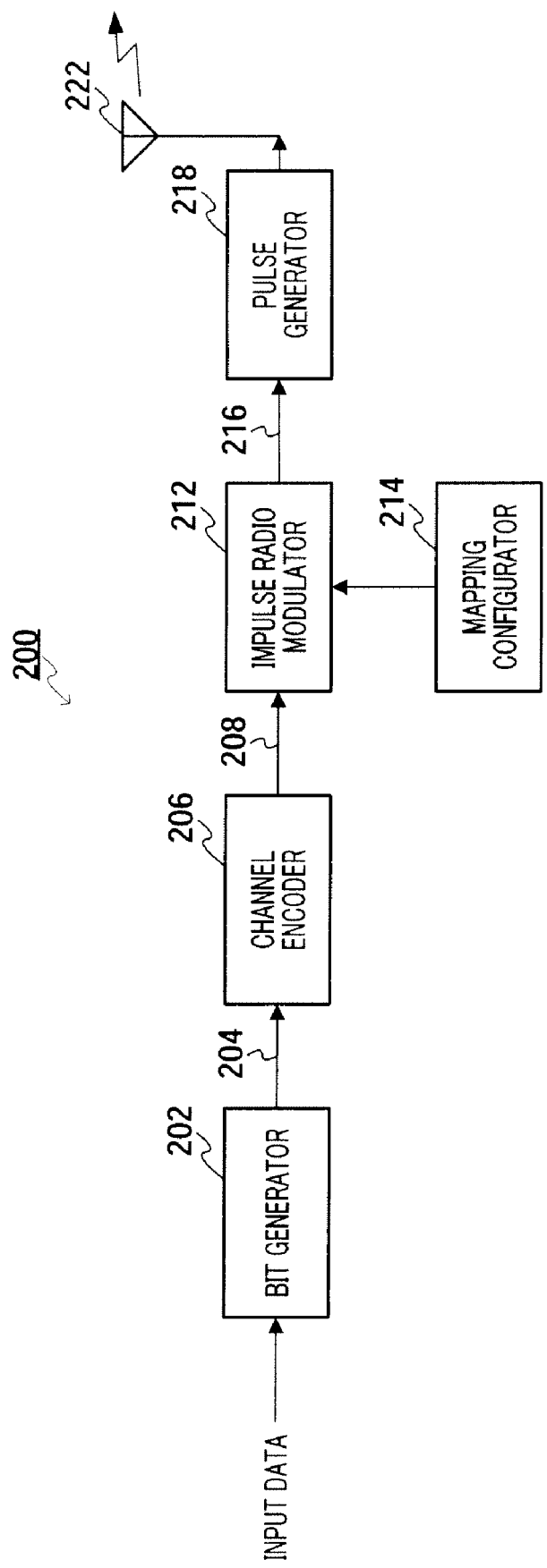
FIG. 5 is a block diagram showing the configuration of a transmitting apparatus in impulse radio communication according to the present invention.

FIG. 5 is a block diagram showing the configuration of a transmitting apparatus in impulse radio communication, according to the present invention. Transmitting apparatus 200 is configured with bit generator 202, channel encoder 206, impulse radio modulator 212, mapping configurator 214, pulse generator 218 and transmitting antenna 222.

Bit generator 202 generates digital data stream 204 from input data. The input data may include text data, video data, image data, audio data or combinations of these. Channel encoder 206 performs error correction coding such as block coding and convolutional coding on digital data stream 204 and generates encoded data 208.

Impulse radio modulator 212 duplicates encoded data 208 and modulates the data in accordance with a mapping configuration set by mapping configurator 214 using the transmitted-reference preamble sequence, shown in FIGS. 1 to 4. Pulse generator 218 amplifies signal 216 outputted from impulse radio modulator 212, generates signal 216 in a predetermined pulse shape, and transmits generated transmitted-reference preamble 220 by radio from transmitting antenna 222.

Figure 6:
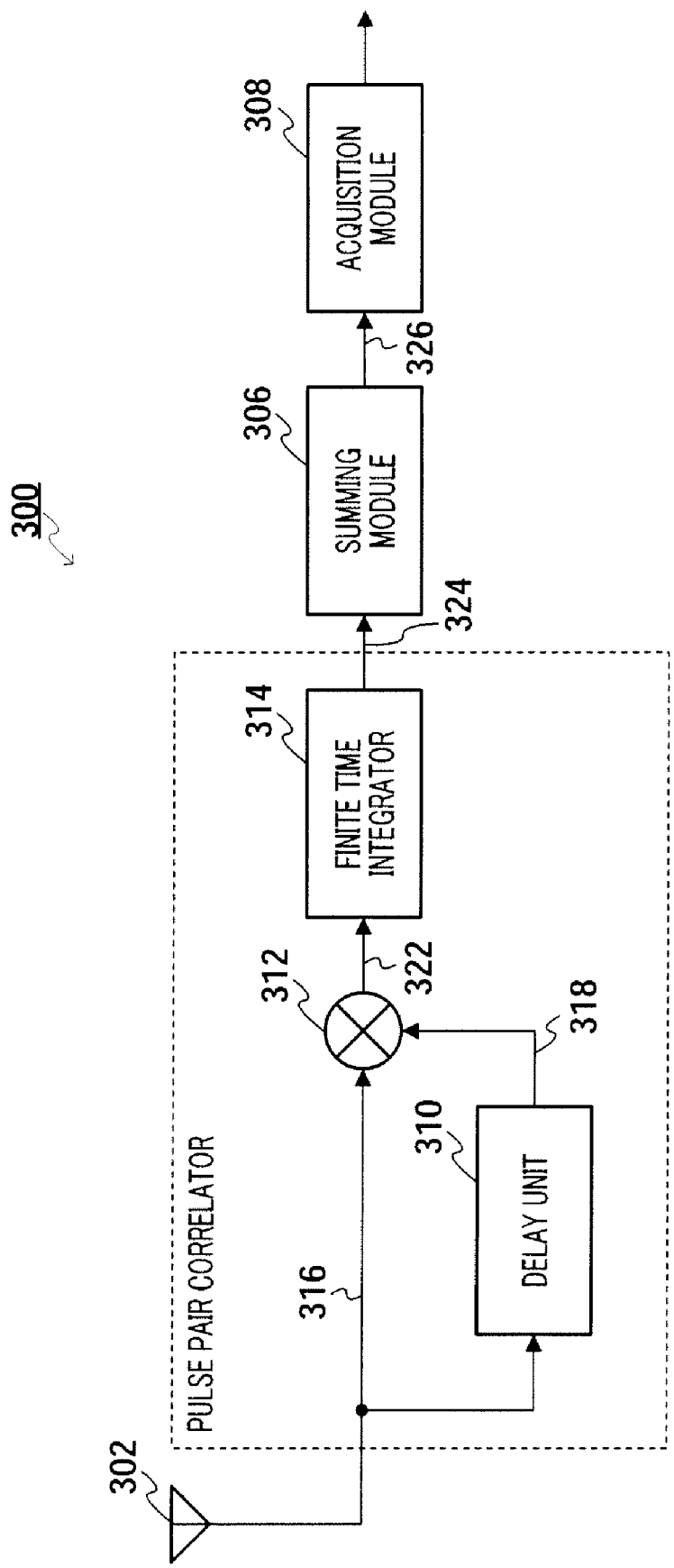
FIG. 6 is a block diagram showing the configuration of a receiving apparatus in impulse radio communication according to the present invention.

FIG. 6 is a block diagram showing the configuration of the receiving apparatus in impulse radio communication according to the present invention. Receiving apparatus 300 is configured with receiving antenna 302, pulse pair correlator 304, summing module 306 and acquisition module 308. Pulse pair correlator 304 is configured with delay unit 310, signal multiplier 312 and finite time integrator 314.

Pulse pair correlator 304 receives signal 316 and splits the signal into two paths. One is directly inputted to signal multiplier 312 and the other is delayed by delay unit 310. Received signal 316 and delay signal 318 from delay unit 310 are multiplied in signal multiplier 312, and non-zero product 322 is integrated in integrator 314 over predetermined time, and signal 324 is generated. The integration time is equal to pulse pair interval 120 shown in FIG. 1. The delay time in delay unit 310 is equal to delay time D between the reference pulse and the data pulse in FIG. 1 to FIG. 4.

Summing module 306 will receive, as input, signals 324 outputted from integrator 314 and add all received signals. The object of this operation is to produce a sum of all integrated outputs of $N_p$ pulse pairs in the transmitted-reference preamble sequence.

Acquisition module 308 detects the presence of the transmitted-reference preamble sequence by comparing summed output 326 outputted from summing module 306 with a predetermined threshold value. The threshold value is dependent on the operating conditions. Thus, the actual value can be obtained by a person skilled in the art. In the case where summed output 326 is greater than the threshold value, acquisition module 308 reports successful synchronization, and, in the case where summed output 326 is smaller than the threshold value, acquisition module 308 reports unsuccessful synchronization.

FIG. 7 shows the structure of a burst signal and correlator output according to the present invention. Transmission data packet 404 is transmitted after transmitted-reference preamble 402. The receiving apparatus uses the time of maximum peak value 406 of pulse pair correlator output detected upon reception of transmitted-reference preamble 402 as a time mark and acquires synchronization with subsequent data packet 404. Here, in FIG. 7, smaller peaks in the correlator output represent autocorrelation side lobes and should be smaller than maximum peak value 406.

INDUSTRIAL APPLICABILITY

The present invention is suitable for use in a receiving apparatus in impulse radio communication.

The invention claimed is:

1. A method of acquiring initial synchronization in impulse radio communication, the method comprising:
   at a transmitting apparatus:
      transmitting a transmitted reference preamble to a receiving apparatus, the transmitted reference preamble being formed with a plurality of identically shaped pulse pairs that are spaced by a predetermined time separation D, each identically shaped pulse pair being separated from neighboring identically shaped pulse pairs at equal pulse pair intervals; and
      transmitting a transmission data packet to the receiving apparatus after having transmitted the transmitted reference preamble to the receiving apparatus; and
   at the receiving apparatus:
      multiplying the transmitted reference preamble and a signal obtained by delaying the transmitted reference preamble by the predetermined time separation D, integrating a result of the multiplication per integration time that is equal to the pulse pair interval, detecting the transmitted-reference preamble based on a result of the integration, and generating a time mark; and
   starting to receive the transmission data packet using the generated time mark at the receiving apparatus.

2. The method of acquiring initial synchronization according to claim 1, wherein a pulse duration of each pulse in one of the identically shaped pulse pairs varies according to a transmission symbol.

3. A receiving apparatus comprising:
   a receiving antenna that receives a transmitted-reference preamble formed with a plurality of identically shaped pulse pairs that are spaced by a predetermined time separation D, each identically shaped pulse pair being separated from neighboring identically shaped pulse pairs at equal pulse pair intervals;
   a delay circuit that delays the transmitted-reference preamble received by the receiving antenna by the predetermined time separation D;
   a multiplier that multiplies the transmitted-reference preamble received by the receiving antenna by the transmitted-reference preamble delayed by the delay circuit;
   an integrator that integrates an output of the multiplier per integration time that is equal to the pulse pair interval;
   a summing module that adds outputs of the integrator; and
   an acquisition module that detects the transmitted-reference preamble by comparing an output of the summing module to a predetermined threshold, and generates a time mark.

* * * * *